(12) United States Patent
Eltoft et al.

(10) Patent No.: US 9,613,245 B1
(45) Date of Patent: Apr. 4, 2017

(54) DEVICE AND METHOD FOR AUTHENTICATION BY A BIOMETRIC SENSOR

(71) Applicant: Motorola Mobility LLC, Chicago, IL (US)

(72) Inventors: Justin Eltoft, Pleasant Prairie, WI (US); Jiri Slaby, Buffalo Grove, IL (US); Lawrence A Willis, Dubuque, IA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/919,995

(22) Filed: Oct. 22, 2015

(51) Int. Cl.
*G06K 9/00* (2006.01)
*G06F 3/16* (2006.01)
*G06F 3/01* (2006.01)

(52) U.S. Cl.
CPC ......... *G06K 9/00013* (2013.01); *G06F 3/016* (2013.01); *G06F 3/167* (2013.01); *G06K 9/00087* (2013.01)

(58) Field of Classification Search
None
See application file for complete search history.

(56) References Cited

U.S. PATENT DOCUMENTS 5,726,443 A * 3/1998 Immega ................ G01S 17/026
250/208.1

* cited by examiner

*Primary Examiner* — Mark Roz

(57) ABSTRACT

There is described an electronic device comprising a biometric authentication sensor and a control circuit, and a method thereof. The biometric authentication sensor detects an object in proximity. The control circuit activates an authentication operation in determining that sensor coverage exceeds a predetermined threshold. The control circuit provides user feedback associated to the sensor coverage in determining that the sensor coverage does not exceed the threshold.

19 Claims, 7 Drawing Sheets

DEVICE AND METHOD FOR AUTHENTICATION BY A BIOMETRIC SENSOR

FIELD OF THE INVENTION

The present invention relates generally to the field of electronic device. In particular, the present invention relates to devices and method for authentication via a biometric authentication sensor.

BACKGROUND OF THE INVENTION

Electronic devices, such as computers, mobile phones, tablet devices, and digital cameras, may include a biometric authentication sensor that is responsive to user touch. A user may touch the biometric authentication sensor using a digit, such as a thumb or finger, to allow the user to access one or more functions of the device.

The biometric authentication sensor may be located offset from the touch surface of the electronic device. The offset may be caused by the placement of a lens on top of the sensor, thereby encasing the sensor below the touch surface. Advantages of locating the biometric authentication sensor offset from the touch surface include cost savings by avoiding cutouts in the lens, minimal impact on the industrial design of the device, and reducing the necessity for a physical key at the touch surface (such as a home key).

Unfortunately, a biometric authentication sensor located offset from the touch surfaces suffers from lack of sensory feedback for the user.

DETAILED DESCRIPTION OF THE EMBODIMENTS

Figure 1:
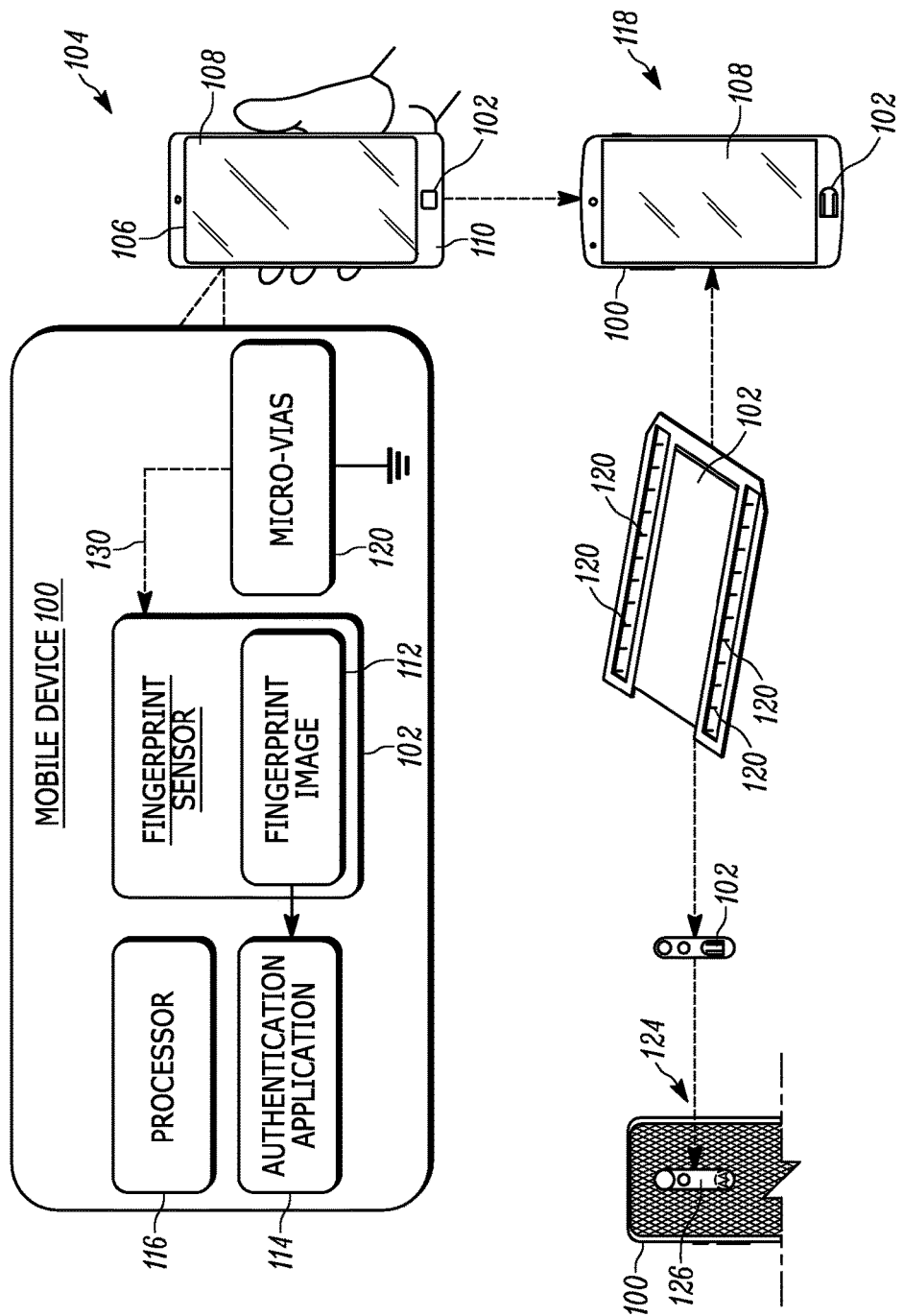
FIG. 1 is a diagrammatic view of an embodiment of the example electronic device in which a biometric authentication sensor is positioned under a surface in accordance with the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated. One skilled in the art will hopefully appreciate that elements in the figures are illustrated for simplicity and clarity and have not necessarily been drawn to scale. For example, the dimensions of some of the elements in the figures may be exaggerated relative to other elements with the intent to help improve understanding of the aspects of the embodiments being illustrated and described.

There is described fingerprint sensor technology, being positioned at a particular location below an upper layer of a display or screen, having haptic feedback provided at a surface of the upper layer. The haptic feedback guides the user to a predefined area of the fingerprint sensor for optimal placement of a digit, such as a thumb or finger, at the sensor. The sensor technology achieves improved false rejection rates of the fingerprint sensor, allows for instant sensory feedback of proper finger placement (thus, allowing for "muscle memory" effects), and allows for finger placement at a fingerprint sensor in situations where the user is not looking at the sensor. The sensor technology may be combined in a feedback loop with the fingerprint sensor to ensure optimal sensor coverage, beyond a certain threshold, or a particular level of image quality. In addition, audio or visual queues during sensor engagement may be used to provide feedback during digit engagement with the sensor, in order to guide the digit toward optimal placement at the sensor.

One aspect is an electronic device comprising a biometric authentication sensor and a control circuit coupled to the biometric authentication sensor. The biometric authentication sensor detects an object in proximity. The control circuit activates an authentication operation in response to determining that coverage of the biometric authentication sensor exceeds a predetermined threshold. The control circuit provides user feedback associated to the coverage of the biometric authentication sensor in response to determining that the coverage of the biometric authentication sensor does not exceed the predetermined threshold.

Another aspect is a method of an electronic device. An object in proximity of the biometric authentication sensor is detected. Coverage of the biometric authentication sensor is determined. An authentication operation is activated in response to determining that the coverage of the biometric authentication sensor exceeds a predetermined threshold. User feedback associated to the coverage of the biometric authentication system is provided in response to determining that the coverage of the biometric authentication sensor does not exceed the predetermined threshold.

Referring to FIG. 1, there is illustrated an example electronic device 100 in which embodiments of a biometric authentication sensor under a surface may be implemented. The example electronic device 100 may be any type of mobile phone, tablet device, digital camera, or other types of computing and electronic devices. In this example, the electronic device 100 implements components and features of a biometric authentication sensor 102 that may be utilized by a user of the electronic device for authentication to access and use the device. The biometric authentication sensor 102 may be located at various locations at or near an outer surface of the electronic device 100, such as a front surface, a back surface, or a side surface. As shown at 104, the electronic device 100 includes an integrated display 106 and a surface 108, such as a non-conductive surface, over the integrated display of the electronic device. Examples of the surface 108 may include non-conductive surfaces such as, but are not restricted to, glass, ceramic, plastic, fabric, or other type of material. The material of the surface may depend on compatibility with the technology of the biometric authentication sensor 102. In this example, the biometric authentication sensor 102 is shown positioned in a bezel area 110 around the integrated display 106 of the electronic device, and the surface 108 that covers the integrated display 106 also extends over the bezel area 110 and over the biometric authentication sensor. Examples of the biometric authentication sensor 102 include, but are not restricted to, a fingerprint sensor, a proximity sensor, and a touch sensor.

The biometric authentication sensor 102 may generate a biometric input sample image 112 of a biometric input sample, and an authentication application 114 may then authenticate the user to the electronic device based on the biometric input sample image. The authentication application 114 may be implemented as a software application or module, such as executable software instructions (e.g., computer-executable instructions) that are executable with a processor 116 of the device. Further, the authentication application 114 may be stored on computer-readable storage memory (e.g., a memory device), such as any suitable memory device or electronic data storage implemented in the electronic device. The authentication application 114 may compare biometric templates associated with potential biometric input samples, stored in computer-readable storage memory, with the biometric input samples or biometric input sample images. Additionally, the electronic device 100 may be implemented with various components, such as a processing system and memory, and any number and combination of various components as further described with reference to the example device shown in FIG. 10.

As shown in example 118, the biometric authentication sensor 102 of the electronic device 100 may be positioned under the surface 108 in a configuration that includes activation sensors 120, which are capable of sensing through the surface 108 for user contact when a user of the device initiates authentication with the biometric authentication sensor. When a user of the device places an object or digit, such as a thumb or finger, over the biometric authentication sensor 102 for authentication, the user activates one or more activation sensors 120. The activation sensor or sensors 120 may be any type of sensor, positioned adjacent to the biometric authentication sensor 102, capable of activating the biometric authentication sensor in response to detecting proximity of the object at a predetermined distance from the biometric authentication sensor, such as through the surface 108. The predetermined distance corresponds to a material layer between the object and the biometric authentication sensor. The predetermined distance corresponds to a transparent or translucent layer adjacent to the biometric authentication sensor. Upon activation of the activation sensor or sensors 102, one or more signals 130 may be provided to the biometric authentication sensor(s), and the biometric authentication sensor(s) may respond accordingly, by, for example, capturing a biometric input sample. In another example implementation shown at 124, the biometric authentication sensor 102 may be integrated under a rear bezel 126 of the device housing, along with the imager (e.g., camera device and LED for illumination). In yet another example, the biometric authentication sensor 102 may be located at a side of the electronic device 100.

The activation sensor or sensors 120 may determine whether the object or digit includes at least part of a circulatory system of a biological organism. The activation sensor or sensors 120 may identify fluid flowing through the object or digit. The activation sensor or sensors 120 captures multiple readings of the object or digit to identify changes in the internal portion of the object or digit.

Figure 2:
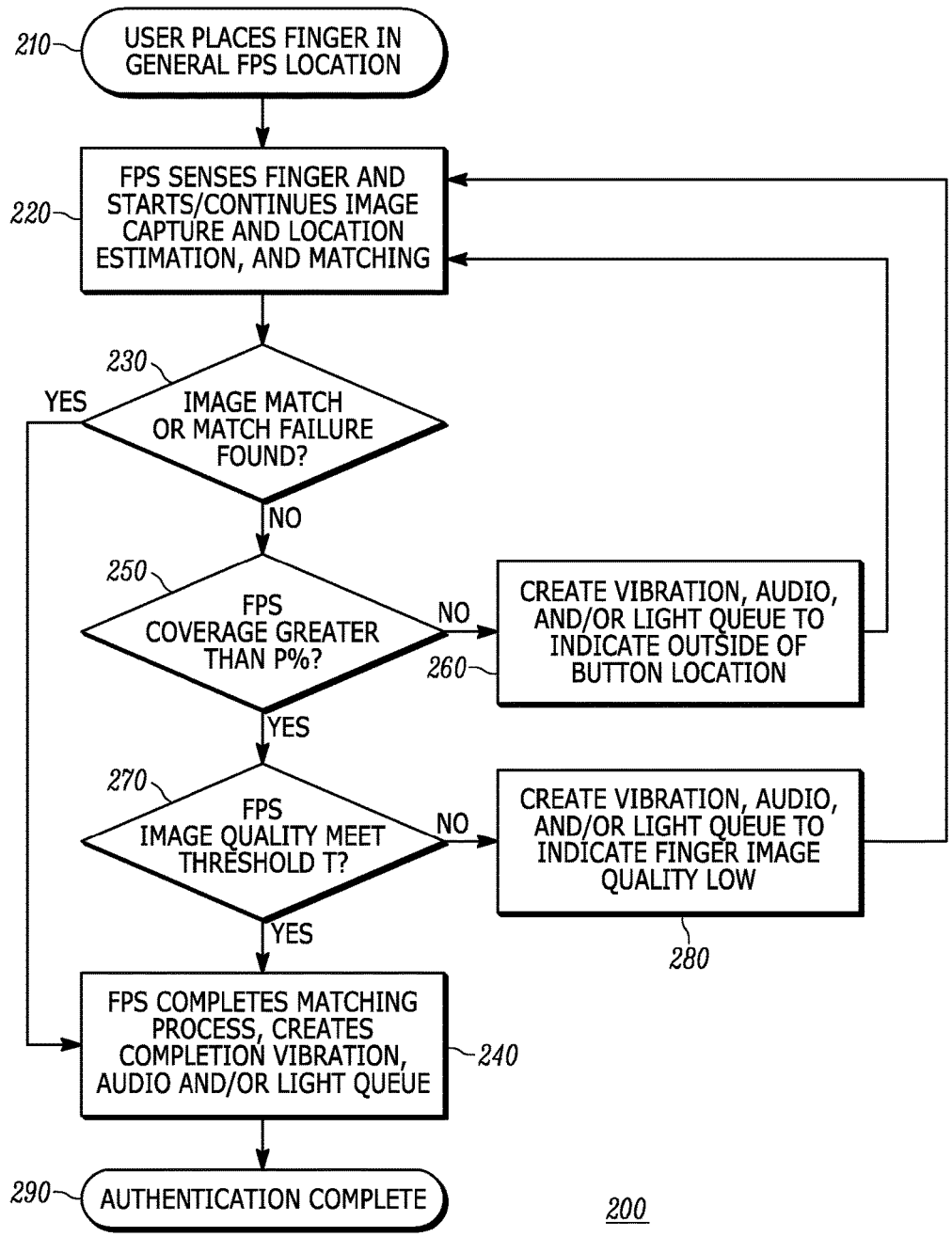
FIG. 2 is a flow diagram of an operation of the electronic device in accordance with the present invention.

Referring to FIG. 2, there is illustrated a flow diagram of an operation of the electronic device. User initiation of the biometric authentication sensor is detected at step 210. For example, the biometric authentication sensor, or an associated or coupled component of the sensor, may detect an object, such as a digit of a user, in proximity of a general location of the sensor. In response to detecting user initiation, the biometric authentication sensor may sense the object and start or continue image capture of a portion of the object at step 220. Also, during step 220, the biometric authentication sensor, or associated component, performs an operation of location estimation of the object relative to the location of the sensor. The biometric authentication sensor may further perform an operation of matching to determine if a captured image of the object matches a stored biometric template.

The electronic device determines whether the captured image of the object matches a stored biometric input sample, at step 230. If a match is identified, then the biometric authentication sensor completes the matching process at step 240.

If a match is not identified at step 230, then a control circuit of the electronic device determines whether coverage of the biometric authentication sensor exceeds a predetermined threshold at step 250. The coverage of the biometric authentication sensor may be based on an amount of surface area of the biometric authentication sensor covered by the object. If the coverage of the biometric authentication sensor does not exceed the predetermined threshold (such as percentage P %), then the control circuit provides user feedback associated to the coverage of the biometric authentication sensor at step 260. The user feedback may be provided by an output component, such as a visual output component, an audio output component, a multimedia output component, or a haptic output component. The user feedback may be vibration, audio, light, or any combination of these types of feedback. Also, the user feedback may be indicated outside of the general area of the biometric authentication sensor, so that it is visible when an object is in the general area of the sensor. An output level of the user feedback may correlate with the coverage of the biometric authentication sensor. The output level of the user feedback may correlate proportionally or indirectly with the coverage of the biometric authentication sensor, and/or with the distance of the user's digit from the sensor. The control circuit may provide the user feedback in response to determining that the object and a biometric input sample captured by the biometric authentication sensor do not match. After the control circuit provides the user feedback at step 260, the biometric authentication sensor may continue image capture of a portion of the object at step 220.

If the coverage of the biometric authentication sensor exceeds the predetermined threshold, then the control circuit activates an authentication operation at step 240. Thereafter, the authentication process is completed at step 290.

Also, if the coverage of the biometric authentication sensor exceeds the predetermined threshold, the control circuit may determine whether a quality of a biometric input sample captured by the biometric authentication sensor does not meet or exceed a predetermined quality threshold T, at step 270. If the quality of the captured biometric input sample does not meet or exceed the predetermined quality threshold, then the control circuit may provide user feedback at step 280. The user feedback, and the output component used to provide the user feedback, may be similar to that described for step 260. After the control circuit provides the user feedback at step 280, the biometric authentication sensor may continue image capture of a portion of the object at step 220. If the quality of the captured biometric input sample meets or exceeds the predetermined threshold, then the control circuit activates an authentication operation at step 240. Thereafter, the authentication process is completed at step 290.

Referring to FIGS. 3 through 7, there are represented embodiments in which an electro-tactile material provides feedback to a user of the electronic device. The electro-tactile material indicates to a user the location of her or his digit, as well as the distance of the digit from a location of the biometric authentication sensor. The feedback may also be provided by other means, such as an extended touch screen, to detect the user's digit, and a vibrator may provide haptic feedback. Similarly, the feedback may be provided via audio that changes in frequency and/or timing. Further, the feedback may be visual, such as providing a blinking light, etc. The electro-tactile material may be detected by a user's digit, such as generating a tactile sensation in the skin of the user. The form of these sensations may be a wide variety of various perceived surfaces or vibrations. For some embodiments, the sensations may be discrete, such as being sensed without being audible.

Figure 3:
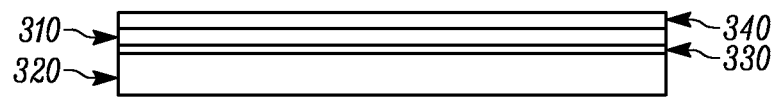
FIG. 3 is a sectional view of an embodiment including electro-tactile feedback at a touch sensitive area of the electronic device.

Referring specifically to FIG. 3, there is shown an embodiment having various layers 300 at a touch sensitive area of the electronic device. The touch sensitive area of the electronic device includes the proximal area of the biometric authentication sensor as well as the surrounding area about the proximal area. The touch sensitive area may extend to other parts of the surface of the electronic device, but is most effective near the biometric authentication sensor. For one embodiment, the various layers 300 of the touch sensitive area include an electro-tactile layer 310 at the outermost surface of a device housing, a lens layer 320 at an inner portion of the device housing, and an adhesive layer 330 between the electro-tactile layer and the lens layer. For another embodiment, the various layers 300 of the touch sensitive area include a hard-coat protective layer 340 located on the electro-tactile layer 310 opposite the lens layer 320 and the adhesive layer 330, such as the hard-coat protective layer is at the outermost surface of the device housing. For yet another embodiment, the touch screen may be integrated below the lens layer, laminated to the lens layer, laminated on top of the lens layer below the electro-tactile layer, or integrated with the display.

Figure 4:
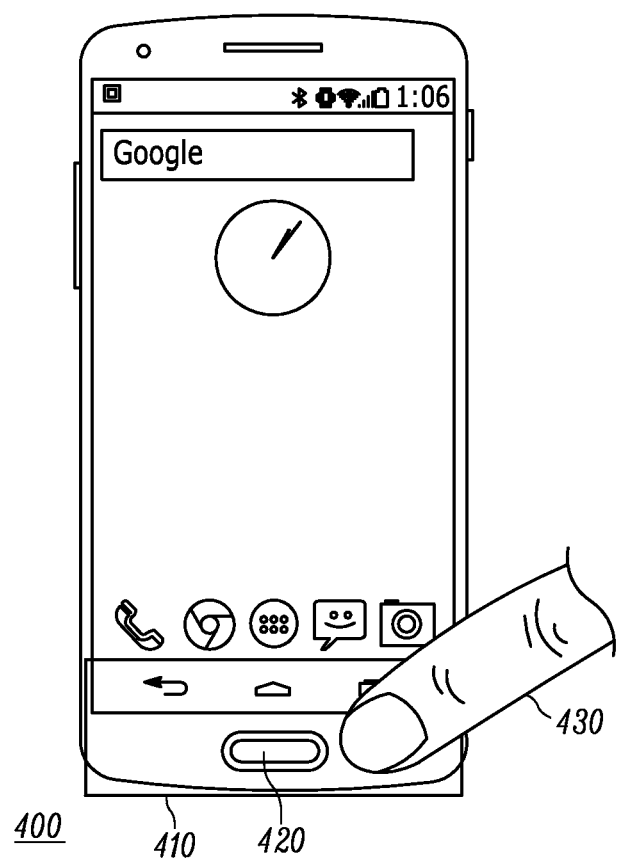
FIGS. 4 through 6 are front planar views of an embodiment, illustrating an operation of the electronic device, in accordance with the present invention.

Referring to FIG. 4, there is shown an embodiment 400 including electro-tactile technology at a touch sensitive area 410 of the electronic device. As shown, the touch sensitive area of the electronic device includes the proximal area of a biometric authentication sensor 420 as well as the surrounding area about the proximal area. For this embodiment 400, the object 430 (i.e., digit of the user) is located at the surrounding area about, thus remote from, the proximal area of the biometric authentication sensor 420. In response, the electro-tactile technology provides a first tactile sensation to indicate to the user that the object 430 is remote from the sensor 420.

Figure 5:
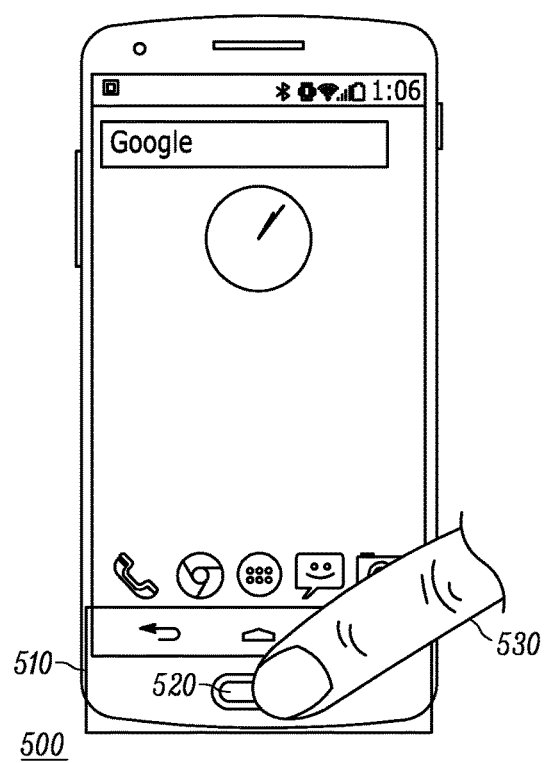

Referring to FIG. 5, there is shown another embodiment 500 including electro-tactile technology at a touch sensitive area 510 of the electronic device. The touch sensitive area of the electronic device includes the proximal area of a biometric authentication sensor 520 as well as the surrounding area about the proximal area. For this embodiment 500, the object 530 (i.e., digit of the user) is co-located at the proximal area of the biometric authentication sensor 520 and the surrounding area about the proximal area of the sensor. The object 530 is partially located at the proximal area and partially located at the surrounding area about the proximal area. In response, the electro-tactile technology provides a second tactile sensation different from the first tactile sensation to indicate to the user that the object 530 is remote from the sensor 520.

Figure 6:
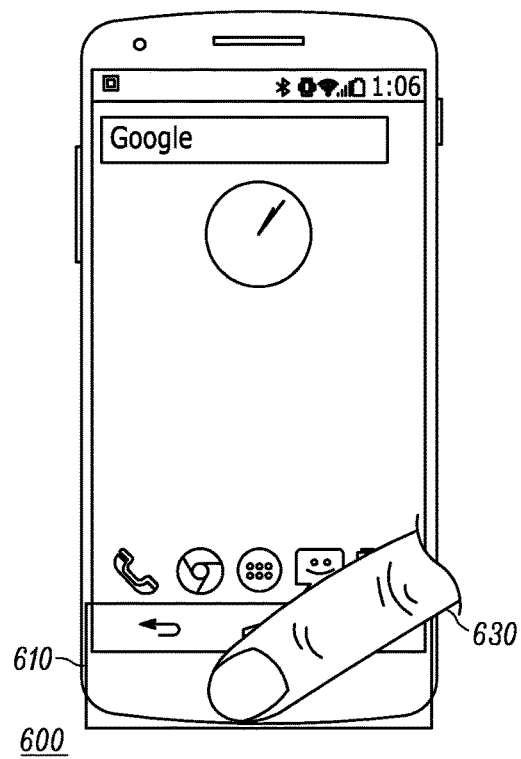

Referring to FIG. 6, there is shown yet another embodiment 600 including electro-tactile technology at a touch sensitive area 610 of the electronic device. The touch sensitive area of the electronic device includes the proximal area of a biometric authentication sensor (not visible) as well as the surrounding area about the proximal area. For this embodiment 600, the object 630 (i.e., digit of the user) is located at the proximal area of the biometric authentication sensor. In response, the electro-tactile technology provides a third tactile sensation different from the first tactile sensation to indicate to the user that the object 530 is remote from the sensor 520. For one embodiment, the intensity of the second tactile sensation may be between the intensities of the first and third tactile sensations. For another embodiment, the intensity of the first or third tactile sensation may be non-detectable, or nearly non-detectable, by the digit of the user.

Figure 7:
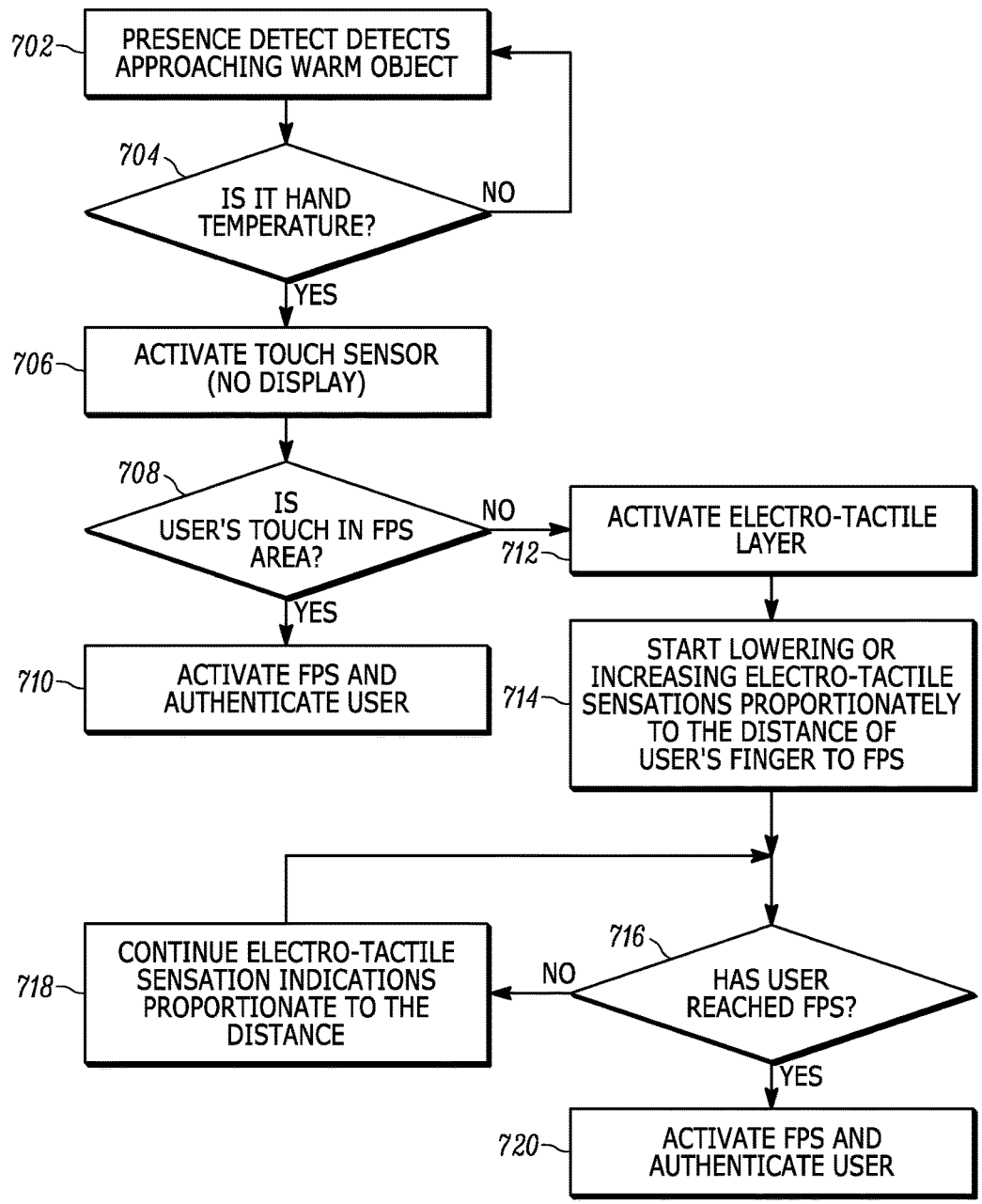
FIG. 7 is a flow diagram illustrating an operation of the electronic device in accordance with the present invention.

Referring to FIG. 7, there is represented an operation 700 of the electronic device. For this operation, a presence detection sensor of the electronic device may detect the approach of an object at step 702. The presence detection sensor, or associated sensor, may detect temperature differential and, thus, detect a temperature of the approaching object at step 704. For example, the presence detection sensor, and any associated components, may determine that a user's hand is approaching the electronic device in response to detecting a larger object having a temperature within a temperature range of a typical human hand.

After detecting the approach of an object, a touch sensor beyond the area adjacent to a display may detect activation at step 706. For example, the object may be detected at the touch sensitive area of the electronic device, including the proximal area of a biometric authentication sensor as well as the surrounding area about the proximal area. If the object is detected at the proximal area of the biometric authentication sensor at step 708 (as represented by FIG. 6), then the sensor is activated at step 710 for authenticating the user.

If the object is not detected at the proximal area of the biometric authentication sensor (i.e., partially or wholly in the surrounding area) at step 708 (as represented by FIGS. 4 and 5), then the electro-tactile layer is activated at step 712. For some embodiments, the electro-tactile sensations of the electro-tactile layer may be set based on the detected location of the object relative to the proximal area of the biometric authentication sensor. For other embodiments, the electro-tactile sensations of the electro-tactile layer may be increased or decreased, proportionally or disproportionately, based on the distance of the object from the proximal area, as represented by step 714. It is to be understood that the electro-tactile sensations may be, or include, visual feedback in the form of a light signal or auditory feedback in the form of an audio signal.

After an initial electro-tactile sensation is provided at step 712 and/or step 714, the operation 700 determines whether the object has reached the proximal area of the biometric authentication sensor at step 716. The electro-tactile sensations may be provided in a continuous manner, varying the sensations based on the distance from the proximal area, or the electro-tactile sensations may be provided discretely in response to movement of the object at the touch sensitive area. The operation continues to provide feedback to the object (i.e., the user) at step 718 until the object reaches the proximal area at step 716, or until the operation is terminated (not shown). If the object reaches the proximal area of the biometric authentication sensor at step 716 (as represented by FIG. 6), then the sensor is activated at step 720 for authenticating the user.

Figure 8:
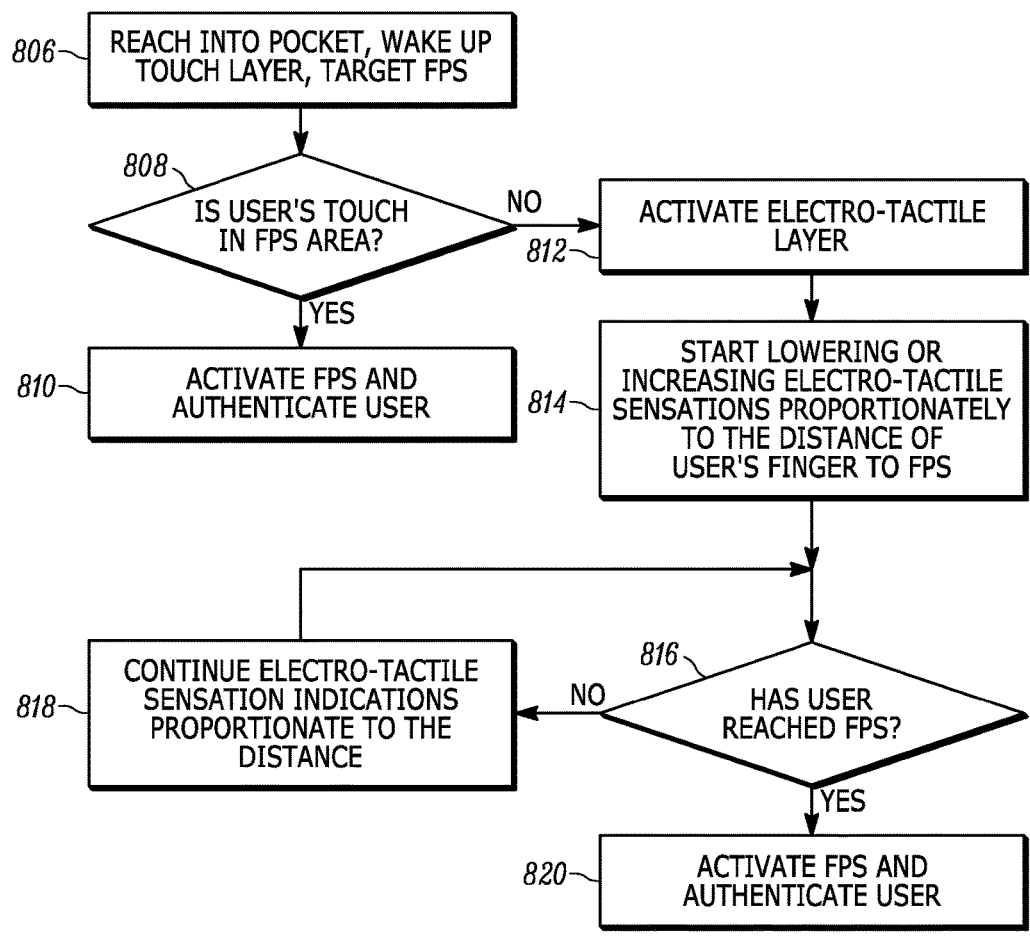
FIG. 8 is a flow diagram illustrating another operation of the electronic device in accordance with the present invention.

Referring to FIG. 8, there is represented another operation 800 of the electronic device. For this operation, the electronic device may activate a touch layer in response to a user action at step 806. If an object is detected at the proximal area of the biometric authentication sensor at step 808 (as represented by FIG. 6), then the sensor is activated at step 810 for authenticating the user.

If the object is not detected at the proximal area of the biometric authentication sensor (i.e., partially or wholly in the surrounding area) at step 808 (as represented by FIGS. 4 and 5), then the electro-tactile layer is activated at step 812. For some embodiments, the electro-tactile sensations of the electro-tactile layer may be set based on the detected location of the object relative to the proximal area of the biometric authentication sensor. For other embodiments, the electro-tactile sensations of the electro-tactile layer may be increased or decreased, proportionally or disproportionately, based on the distance of the object from the proximal area, as represented by step 814. Again, it is to be understood that the electro-tactile sensations may be, or include, visual feedback in the form of a light signal or auditory feedback in the form of an audio signal.

After an initial electro-tactile sensation is provided at step 812 and/or step 814, the operation 800 determines whether the object has reached the proximal area of the biometric authentication sensor at step 816. The electro-tactile sensations may be provided in a continuous manner, varying the sensations based on the distance from the proximal area, or the electro-tactile sensations may be provided discretely in response to movement of the object at the touch sensitive area. The operation continues to provide feedback to the object (i.e., the user) at step 818 until the object reaches the proximal area at step 816, or until the operation is terminated (not shown). If the object reaches the proximal area of the biometric authentication sensor at step 816 (as represented by FIG. 6), then the sensor is activated at step 820 for authenticating the user.

For some embodiments, the user may locate the biometric authentication sensor and unlock the electronic device quietly and discretely without looking at the device, and generating noise. The electronic device may also provide a selectable tactile feedback with a variety of perceived finishes on a perfectly flat surface such as glass and/or sapphire.

Figure 9:
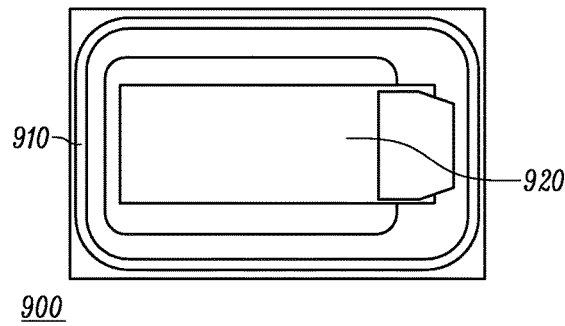
FIG. 9 is a close-up view of an embodiment in which an electrochromic guide provides feedback to the user of the electronic device.

Referring to FIG. 9, there is illustrated an electrochromic guide 910 positioned about a biometric authentication sensor 920 to provide feedback to the user of the electronic device. The electrochromic guide 910 may be a bi-stable element that is transparent or translucent during normal use. The electrochromic guide 910 may be triggered by the user's proximity to the biometric authentication sensor 920 during an authentication context. The electrochromic guide 910 may return to a transparent or translucent state following authentication.

For the electrochromic guide 910, a bi-stable electrochromic guide is embedded between the sensor layer and touch display surface. The default state for this electrochromic guide 910 may be transparent or translucent. As the user's approach is detected via another sensor, such as infrared, ultrasound or other means, an electrical/electronic signal may be applied to the electrochromic guide 910 and, in response, the guide may become non-transparent or non-translucent. This approach may save power consumption if the guide is activated in pocket due to the bi-stable nature of the guide material.

The color of the guide can be altered based upon an electrical/electronic signal. The color may represent the state or states of authentication. For example, the color white may represent pre-authentication, blue may represent successful authentication, red may represent failed authentication, and green may represent verification of a mobile payment. In other embodiments, this approach can be applied to any sensor type that is "hidden", such as, for example, pressure, temperature, surface stress, etc., that may provide guidance to the user to perform an action.

Figure 10:
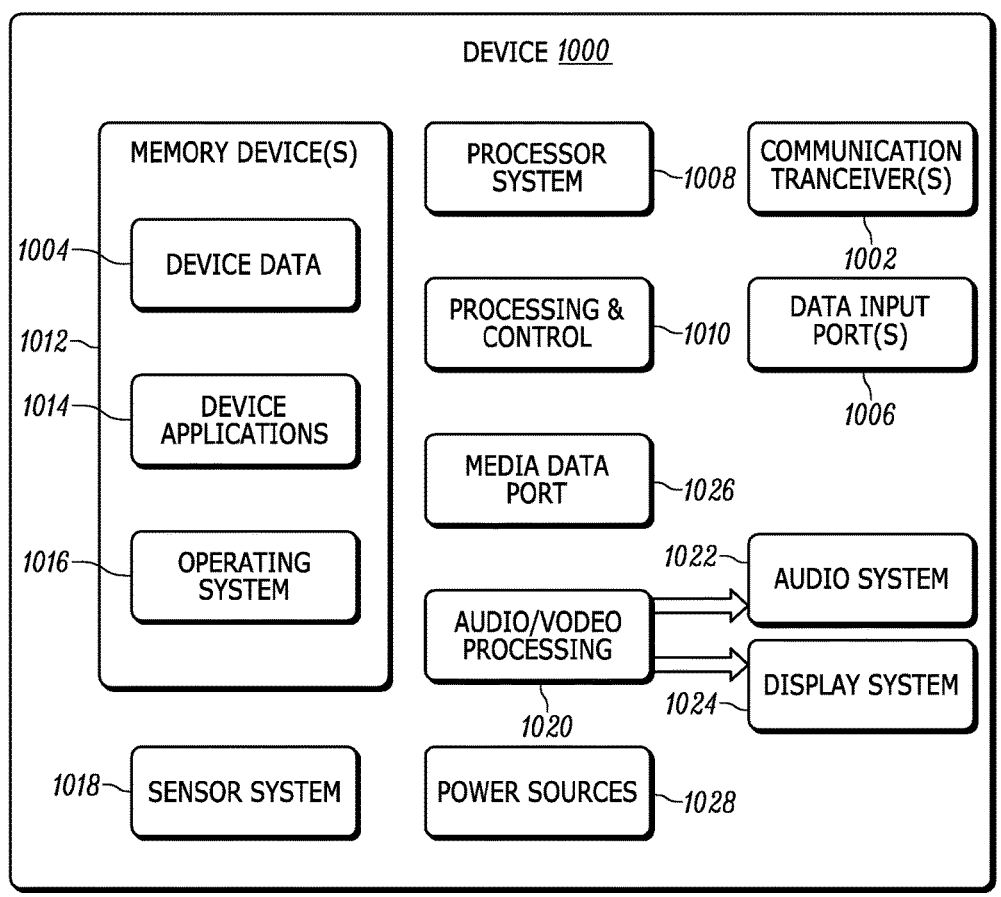
FIG. 10 is a block diagram of an embodiment in accordance with the present invention.

Referring to FIG. 10, there are illustrated various components of an example device 1000 in which embodiments of biometric authentication sensor under a surface. The example device 1000 may be implemented as any of the electronic devices described with reference to the previous figures, such as any type of client device, mobile phone, tablet, computing, communication, entertainment, gaming, media playback, and/or other type of device. For example, the electronic device 100 shown in FIG. 1 may be implemented as the example device 1000.

The device 1000 includes communication transceivers 1002 that enable wired and/or wireless communication of device data 1004 with other devices. Additionally, the device data may include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 1000 may also include one or more data input ports 1006 via which any type of data, media content, and/or inputs may be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processing system 1008 of one or more processors (e.g., any of microprocessors, controllers, and the like) and/or a processor and memory system implemented as a system-on-chip (SoC) that processes computer-executable instructions. The processor system may be implemented at least partially in hardware, which may include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device may be implemented with any one or combination of software, hardware, firmware, or fixed logic circuitry that is implemented in connection with processing and control circuits (such as the control circuits described above), which are generally identified at 1010. The device 1000 may further include any type of a system bus or other data and command transfer system that couples the various components within the device. A system bus may include any one or combination of different bus structures and architectures, as well as control and data lines.

The device 1000 also includes computer-readable storage memory 1012 that enable data storage, such as data storage devices that may be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory may include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 may be maintained as software instructions with a memory device and executed by the processing system 1008. The device applications may also include a device manager, such as any form of a control application, software application, signal-processing and control module, code that is native to a particular device, a hardware abstraction layer for a particular device, and so on. In this example, the device 1000 includes a sensor system 1018 that implements embodiments of a biometric authentication sensor under a surface, and may be implemented with hardware components and/or in software, such as when the device 1000 is implemented as the electronic device 100 described with reference to FIGs. above. An example of the sensor system 1018 is the biometric authentication sensor 102, the activation sensor or sensors 120, and the authentication application 114 that are implemented by the electronic device 100.

The device 1000 also includes an audio and/or video processing system 1020 that generates audio data for an audio system 1022 and/or generates display data for a display system 1024. The audio system and/or the display system may include any devices that process, display, and/or otherwise render audio, video, display, and/or image data. Display data and audio signals may be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1026. In implementations, the audio system and/or the display system are integrated components of the example device. Alternatively, the audio system and/or the display system are external, peripheral components to the example device.

The device 1000 may also include one or more power sources 1028, such as when the device is implemented as an electronic device. The power sources may include a charging and/or power system, and may be implemented as a flexible strip battery, a rechargeable battery, a charged super-capacitor, and/or any other type of active or passive power source.

Although embodiments of a biometric authentication sensor under a surface have been described in language specific to features and/or methods, the subject of the appended claims is not necessarily limited to the specific features or methods described. Rather, the specific features and methods are disclosed as example implementations of a biometric authentication sensor under a surface, and other equivalent features and methods are intended to be within the scope of the appended claims. Further, various different embodiments are described and it is to be appreciated that each described embodiment may be implemented independently or in connection with one or more other described embodiments.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An electronic device comprising:
 a biometric authentication sensor with activation sensors to detect an object in proximity to the biometric authentication sensor; and
 a control circuit coupled to the biometric authentication sensor, the control circuit implemented to:
 activate an authentication operation in response to determining that coverage of the biometric authentication sensor by the object exceeds a predetermined threshold; and
 provide user feedback associated with the coverage of the biometric authentication sensor in response to determining that the coverage of the biometric authentication sensor does not exceed the predetermined threshold based on the activation sensors, the user feedback being proportional to an amount of the coverage of the biometric authentication sensor by the object, a strong user feedback being provided if the object is closer to the biometric authentication sensor, and a weak user feedback being provided if the object is farther away from the biometric authentication sensor.

2. The electronic device of claim 1, wherein the biometric authentication sensor is a sensor selected from a group consisting of a fingerprint sensor, a proximity sensor, and a touch sensor.

3. The electronic device of claim 1, wherein the coverage of the biometric authentication sensor is based on an amount of surface area of the biometric authentication sensor covered by the object.

4. The electronic device of claim 1, wherein the user feedback is provided by at least one output component selected from a group consisting of a visual output component, an audio output component, a multimedia output component, and a haptic output component.

5. The electronic device of claim 1, wherein an output level of the user feedback correlates with the coverage of the biometric authentication sensor.

6. The electronic device of claim 5, wherein the output level of the user feedback correlates proportionally with the coverage of the biometric authentication sensor.

7. The electronic device of claim 5, wherein the output level of the user feedback correlates indirectly with the coverage of the biometric authentication sensor.

8. The electronic device of claim 1, wherein the control circuit provides the user feedback in response to determining that the object and a biometric input sample captured by the biometric authentication sensor do not match.

9. A method of an electronic device comprising:
 detecting an object in proximity to a biometric authentication sensor with activation sensors;

determining coverage of the biometric authentication sensor based a number of the activation sensors that detect the proximity of the object; and one of activating an authentication operation in response to determining that the coverage of the biometric authentication sensor exceeds a predetermined threshold; or providing user feedback associated with the coverage of the biometric authentication system in response to determining that the coverage of the biometric authentication sensor does not exceed the predetermined threshold, the user feedback being proportional to an amount of the coverage of the biometric authentication sensor by the object, a strong user feedback being provided if the object is closer to the biometric authentication sensor, and a weak user feedback being provided if the object is farther away from the biometric authentication sensor.

10. The method of claim 9, wherein the biometric authentication sensor is a sensor selected from a group consisting of a fingerprint sensor, a proximity sensor, and a touch sensor.

11. The method of claim 9, wherein determining the coverage of the biometric authentication sensor includes determining the coverage of the biometric authentication sensor based on an amount of surface area of the biometric authentication sensor covered by the object.

12. The method of claim 9, wherein the user feedback is provided by at least one output component selected from a group consisting of a visual output component, an audio output component, a multimedia output component, and a haptic output component.

13. The method of claim 9, wherein providing the user feedback includes correlating an output level of the user feedback with the coverage of the biometric authentication sensor.

14. The method of claim 13, wherein providing the user feedback includes correlating the output level of the user feedback proportionally with the coverage of the biometric authentication sensor.

15. The method of claim 13, wherein providing the user feedback includes correlating the output level of the user feedback indirectly with the coverage of the biometric authentication sensor.

16. The method of claim 9, wherein providing the user feedback includes providing the user feedback in response to determining that the object and a biometric input sample captured by the biometric authentication sensor do not match.

17. A system comprising:

a biometric authentication sensor that captures a fingerprint image of a finger based on contact of the finger proximate the biometric authentication sensor;

activation sensors that detect the contact by the finger proximate the biometric authentication sensor, wherein an amount of coverage of the biometric authentication sensor by the finger is determinable based on a number of the activation sensors that detect the contact by the finger; and a user feedback component to generate an indication that the amount of the coverage of the biometric authentication sensor by the finger is not enough to initiate authentication if the amount of the coverage does not exceed a contact threshold, the indication being proportional to the amount of the coverage of the biometric authentication sensor by the finger, a strong indication being generated if the contact by the finger is closer to the biometric authentication sensor, and a weak indication being generated if the contact by the finger is farther away from the biometric authentication sensor.

18. A system as recited in claim 17, further comprising an authentication module that authenticates the fingerprint image of the finger based on the amount of the coverage of the biometric authentication sensor by the finger exceeding the contact threshold for initiating authentication.

19. A system as recited in claim 17, wherein the user feedback is generated as the indication inversely proportional to the amount of the coverage of the biometric authentication sensor by the finger, a strong indication being generated if the contact by the finger is farther away from the biometric authentication sensor, and a weak indication being generated if the contact by the finger is closer to the biometric authentication sensor.

* * * * *